UNITED STATES PATENT OFFICE.

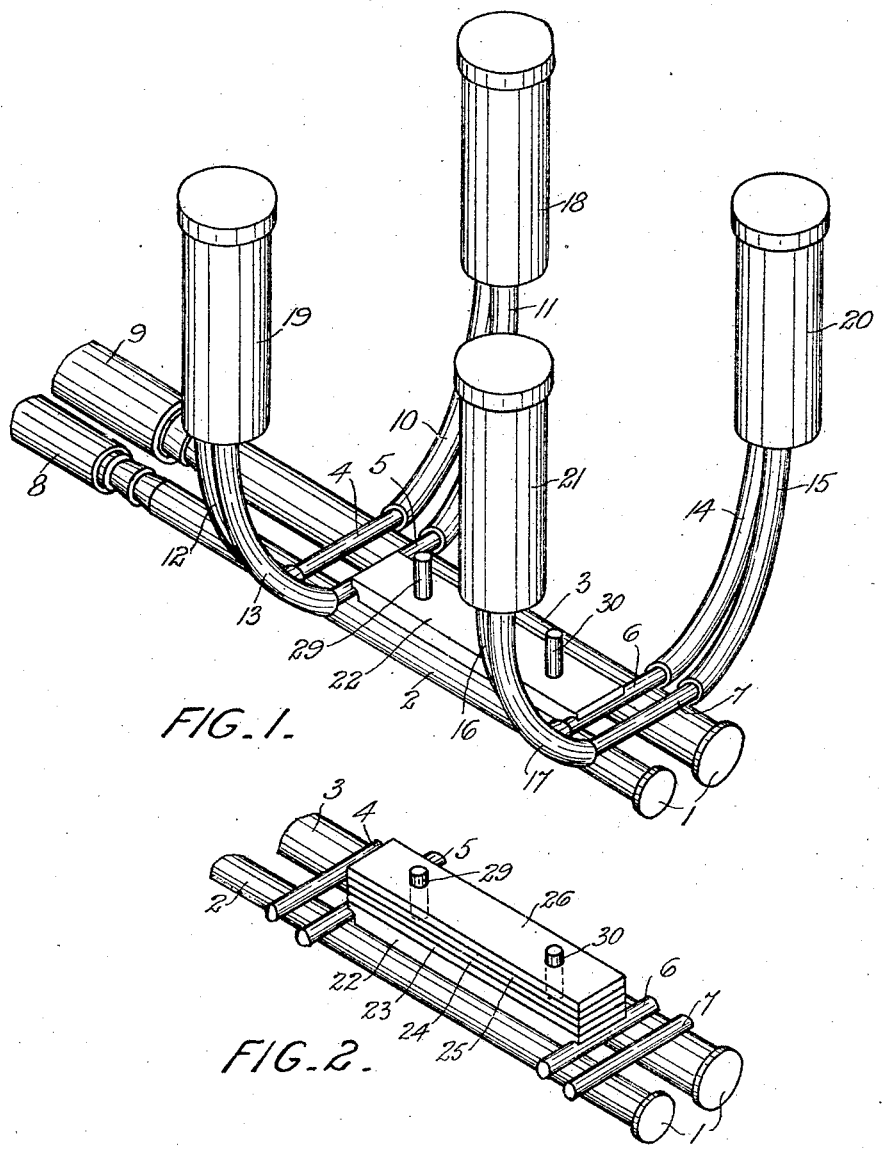

EDITH AMY COOK, OF GLENOMARU, OTAGO, NEW ZEALAND.

COW MILKER.

1,417,801.  Specification of Letters Patent.  Patented May 30, 1922.

Application filed April 12, 1921. Serial No. 460,679.

*To all whom it may concern:*

Be it known that EDITH AMY COOK, citizen of the British Empire, residing at Woodside, Ahuriri Flat, Glenomaru, Otago, New Zealand, has invented certain new and useful Improvements in Cow Milkers, of which the following is a specification.

This invention relates to milking machines of any ordinary type and in particular in which there is a claw to which four teat cups are attached by pipe connections. The defect of all milking machines is that they do not strip cows properly of milk and with the result that the cows tend to go dry and ultimately, if stripping is neglected, will go dry. At present this stripping is done by hand. The object of this invention is to do away with the necessity of stripping cows by hand and to get them stripped by the milking machine as part of the process of milking. My invention consists broadly in this and I have found that by making the claw teat cups and connecting pipes approximately of a total weight of sixty eight ounces avoirdupois, that is approximately thirteen and one half ounces more than they usually weigh, stripping is effected by the machine itself or rather the machine operates so that no stripping is necessary. The weight may be detachable or formed integral with the teat cups and or with the claw. This weight will vary according to the type of machine used and the weight of its teat cups and attachments and can be arrived at by slight experiment with greater or less weight than about thirteen and one half ounces or than the total weight of sixty eight ounces by adding to or taking away portions of metal or the like adapted for the purpose on the teat cups or claw or connecting pipes.

The preferred form embodying the invention is illustrated in the accompanying drawings in which Figure 1 is a perspective view of a claw and four connected teat cups of a milking machine with an adjustable weight connected to the claw. Figure 2 is a detail drawing showing the claw with weight attached and the means for varying the weight attached and the means for varying weight. Figure 3 is a perspective view of the removable weight showing the detachable strips. As is usual the claw 1 is composed of the milk pipe 2 and the vacuum pipe 3 connected together by the transverse pipes 4, 5, 6, 7. The usual rubber milk pipe 8 and vacuum pipe 9 are attached to the claw. From the transverse pipes 4, 5 and 6, 7 respectively rise the usual rubber pipes 10, 11 and 12, 13, 14, 15 and 16, 17 to the usual teat cups 18, 19, 20 and 21 respectively. To the claw 1 is secured a weighted piece 22 either detachable or fixed but carrying detachable strips 23, 24, 25, 26 of approximately one or two ounces weight said strips having holes 27, 28 in them adapted to fit on the pins 29, 30 of the main weight 22. It will be seen that by removing or adding strips the total weight can be easily or quickly lessened or increased and accurately adjusted for and according to the circumstances of each case.

As stated in the foregoing paragraph, a total weight of sixty eight ounces would be all that is necessary to successfully strip the udder of the average cow of its milk, but when a cow becomes old this weight is not sufficient to aid the milkers in stripping the udder. Therefore, it has been found desirable to add an additional weight of thirteen and one half ounces to the present sixty eight ounces, making a total of eighty one and one half ounces, for old cows. Of course this weight may be varied to any intermediate amount, but any further weighting, unless in exceptional cases, would draw blood and cause a rupture of the udder.

I claim :—

1. In a milking machine having a claw and teat cups connected thereto, the combination with the claw of a weighted piece approximating sixty eight ounces avoirdupois substantially as and for the purposes set forth.

2. In a milking machine having a claw and teat cups connected thereto the combination with the claw of an adjustable weighted piece substantially as and for the purposes set forth.

3. In a milking machine in combination with a claw, of teat cups, pipes connecting said claw to said teat cups, and insertible weights carried by said claw for varying the total weight of the latter up to eighty one and one half ounces avoirdupois.

In testimony whereof she has affixed her signature in presence of two witnesses.

EDITH AMY COOK.

Witnesses:
 DOUGLAS RAMSEY,
 OWEN E. MACKIE.